United States Patent [19]

Washburn

[11] 4,417,368

[45] Nov. 29, 1983

[54] APPARATUS FOR AND PROCESS OF CONTROLLED SUB-VOLUME FILLING OF CASINGS

[75] Inventor: Harry G. Washburn, Mt. Prospect, Ill.

[73] Assignee: Teepak, Inc., Chicago, Ill.

[21] Appl. No.: 286,316

[22] Filed: Jul. 24, 1981

[51] Int. Cl.³ .............................................. A22C 11/02
[52] U.S. Cl. ........................................... 17/49; 17/33
[58] Field of Search ................................. 17/33, 35, 49

[56] References Cited

U.S. PATENT DOCUMENTS

| | | | |
|---|---|---|---|
| 3,148,408 | 9/1964 | Good | 17/35 |
| 3,317,950 | 5/1967 | Ziolko | 17/35 X |
| 3,421,434 | 1/1969 | Krachmer | 17/35 X |
| 3,540,075 | 11/1970 | Kempe et al. | 17/34 |
| 3,694,853 | 10/1972 | Greider | 17/33 |
| 4,112,546 | 9/1978 | Müller | 17/33 X |

Primary Examiner—Willie G. Abercrombie
Attorney, Agent, or Firm—William J. Crossetta, Jr.; Michael L. Dunn

[57] ABSTRACT

This relates to the filling and forming of food product units such as sausage links, wherein a flowable fill is introduced into a shirred casing through a conventional filling head and wherein a controlled underfilling of the preselected circular cross section casing is automatically maintained by modifying the cross section of the casing from circular to oval. In this manner the required underfilling of the casing is automatically effected so that the necessary space for the product fill is automatically supplied to permit the necessary crimping and twisting of the casing to define links of uniform size and weight or other changes in volume due to processing. This abstract forms no part of the specification of this application and is not to be construed as limiting the claims of the application.

12 Claims, 6 Drawing Figures

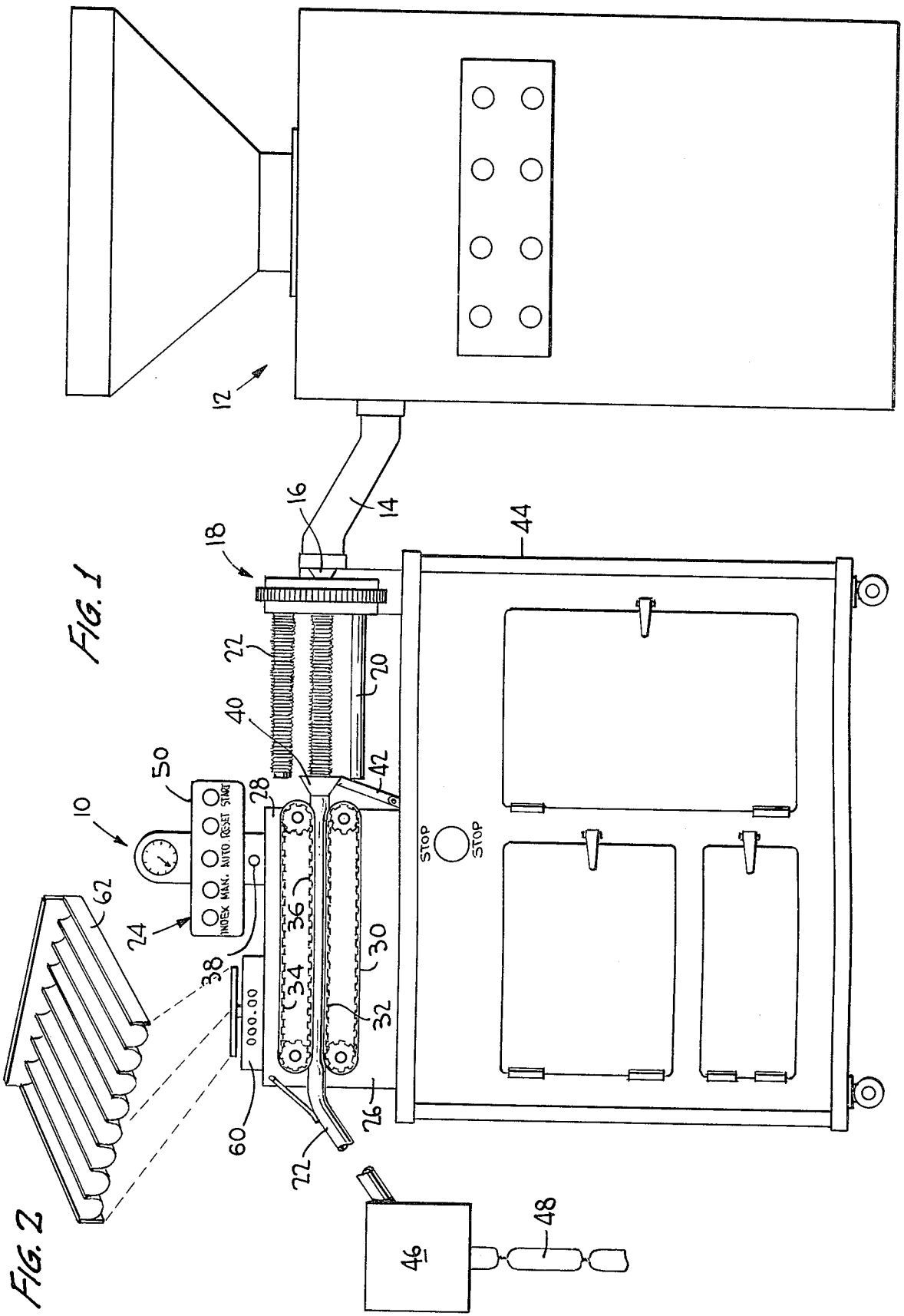

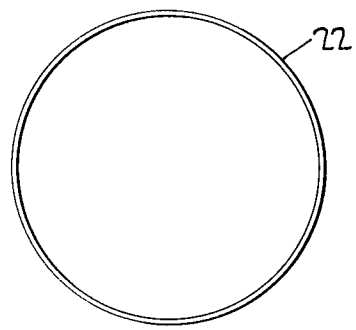
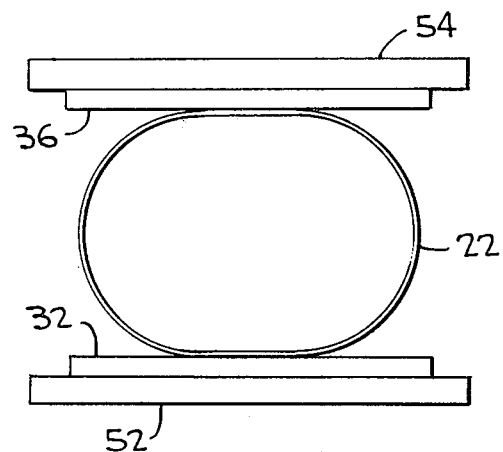
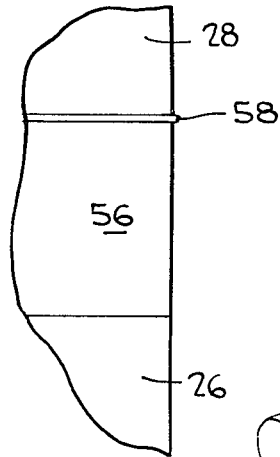
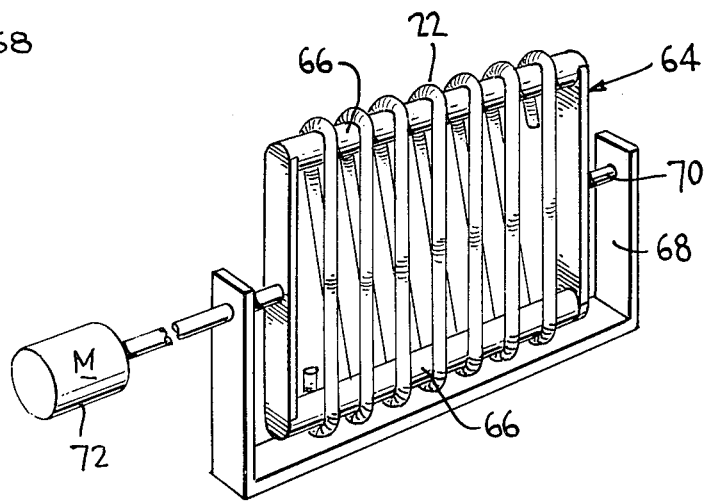

APPARATUS FOR AND PROCESS OF CONTROLLED SUB-VOLUME FILLING OF CASINGS

This invention relates in general to new and useful improvements in the filling of casings which are further subjected to operations wherein there is a desire for a sub-volume filling of the casings. The invention relates, as one example, to the filling of fresh sausage in collagen casings wherein subsequent to the filling of the casing, the casing is twisted at regular intervals to define links. Another example of a requirement for a sub-volume filling of the casing is where the product is cooked and the product may expand more than the casing during such cooking. A still further example of a requirement for a sub-volume filling of a casing is in the formation of beef sticks which are made by gathering the filled casing on a reel and the product is cooked under tension with there being a material shrinkage due to moisture loss of both the meat product and the casing without the original length of the casing and fill changing.

It is to be understood that this invention is not limited to either the casing material or the specific product.

A mechanical filling machine is currently used to fill a casing to a sub-volume capacity wherein the product is stuffed into the casing through a filling head while a skilled worker restrains the reels of the shirred or accordion pleated tubular casing in an attempt to feed the casing evenly with reference to the flow of the fill product so as to maintain the casing evenly underfilled throughout its length.

With respect to the formation of sausage links and like link products, the purpose of underfilling the casing is to leave a fraction of the diameter potential of the casing as a reservoir of space to be utilized as the filled sausage casing passes through a twisting linker. The conventional linker machine crimps the partially filled casing in preset increments of length and by means of roller grippers, twists the captured portion forming twists or pigtails at the link ends. The shortening of the casing due to crimping and twisting forces the encased meat product out of the crimped and twisted portion of the casing into adjacent portions of the casing and, when the casing is properly underfilled, the resultant links have the casing thereof completely filled to the desired extent.

Other products which require a controlled sub-volume filling of casings include products which are cooked after the filling thereof into casings and wherein there is an expansion of the product greater than the expansion characteristics of the casing.

There are also products which require underfilling in casings wherein the products are reeled to define product lengths which are identical and wherein the casing is under tension in each length, and wherein in the cooking or smoking of the product there is material shrinkage of the product and the casing while the product length remains constant.

While reference hereinafter will be made primarily to the formation of sausage links, it is to be understood that, from the foregoing, the invention is not so limited.

Since all current and known commercial machines employ fillers which cause, or respond to, a fully filled casing diameter, hand-eye judgment is required on the part of the operator to underfill the casing to some criterion of wrinkled appearance which after linking results in a link of desired weight and length. The process of filling the sausage, such as fresh pork or fresh beef sausage, also has other subtleties which are germane to the practice of hand filling.

One is the nature of the meat mass which will smear if there is too much distortion or work inflicted on the meat mass during passage thereof from the filler to and through the filling horn. For this reason, a very short, straight path is required, and the operator must control the filling flows to a rate which does not smear the surface of the product.

In addition, a time period is judged wherein the casing-meat interface allows transfer of moisture from the meat to the casing, which moisturizes the casing to an extent which permits twisting and link expansion to a degree that yields a product of acceptable length and twist permanency. This time period is judged by the skilled operator.

In accordance with this invention, it has been found that a controlled underfilling of the casing may automatically be effected by passing the casing between opposed runs of two endless conveyor belts wherein the spacing of the opposed runs is less than the nominal diameter of the normal circular cross-sectional casing, thereby to modify the circular cross section to a preselected oval cross section so that when the casing with the oval cross section is filled, the end result is a circular cross-sectional casing which is controlled underfilled. In accordance with the invention, the area of the oval cross section casing will be on the order of 85–95% of the designed area of the circular cross section of the same casing.

By modifying the cross section of the casing, it is possible fully to fill the casing without requiring the hand tensioning of the casing by a skilled operator. At the same time, by having the oval casing fully filled, the time required for moisture transfer from the meat product to the casing is shortened, and this makes it important as to how much delay is needed before the filled casing is ready to enter into the conventional linking machine.

In accordance with this invention, the movement of the endless belts which modify the cross section of the casing is accurately controlled so that when the filled casing reaches the linking machine the casing is properly moisturized and proper linking can be effected so as to product uniform links of uniform weight.

It is known in the prior published art to provide, in association with a sausage casing filling apparatus, co-operating conveyors having opposed, spaced apart runs. Attention is directed to the patent to Good No. 3,148,408 granted Sept. 15, 1964. While the filled casing passing through the machine of this patent is also directed to a linking machine, it is to be noted that the circular cross section of the casing is permitted at all times and that the opposed runs of the conveyor belts are permitted to move apart in accordance with the diameter of the filled casing, and that the speed of movement of the conveyor belt runs is controlled in accordance with the spacing of the runs so as to maintain a constant diameter casing in order that a stuffed casing of a preselected diameter is supplied notwithstanding possible changes in the rate of feed of the fill product.

This invention differs from that of the Good patent in that the opposed runs of the conveyor belts are maintained at a selected spacing less than the nomianl diameter of the casing so that the cross section of the casing is modified from circular and wherein the area of the modified cross section is a selected reduced percentage of the area of the circular cross section wherein there is an automatic and precise underfilling of the casing.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is an elevational view of a filling and linking apparatus for forming sausage links in collagen casings, with the sausage links being of uniform size.

FIG. 2 is a perspective view of a weighing tray for receiving a plurality of sausage links.

FIG. 3 is a cross-sectional view of the sausage casing, showing its nominal circular cross section.

FIG. 4 is a schematic sectional view taken through the casing cross section modifying apparatus, and schematically shows how the circular cross-sectional casing of FIG. 3 is modified to have an oval cross section.

FIG. 5 is a schematic view of one corner of the casing cross section modifying apparatus, and shows the manner in which the spacing between the opposed conveyor runs may be adjusted utilizing replaceable shims thereby to vary the cross section of the modified casing cross section.

FIG. 6 is a schematic perspective view showing the sub-volume filled casing mounted on a reel as opposed to being formed into links, with the product to be subjected to cooking while on such reel.

Referring now to the drawings in detail, it will be seen that there is illustrated in FIG. 1 an apparatus in accordance with this invention, the apparatus being identified by the numeral 10. The apparatus 10 includes a conventional casing filling machine 12 which includes a supply conduit 14 which directs a sausage mix or other edible product to a filling nozzle 16 at a predetermined constant rate.

A turrent type filling horn assembly 18 including a plurality of filling horns 20 is associated with the filling nozzle 16 so that as the filling horns 20 are indexed, a filling horn with a new shirred casing 22 thereof will be automatically aligned with and sealed with the filling nozzle 16 to supply a product to the new casing.

The apparatus described thus far is conventional and not in and of itself a part of this invention.

This invention primarily relates to a casing cross section modifying apparatus generally identified by the numeral 24. The apparatus 24 includes a base unit 26 and a top unit 28. The base unit 26 carries a lower endless conveyor 30 having an upper portion thereof defining a lower run 32.

The top unit 28 also includes an endless conveyor belt 34 which has a lower portion thereof defining a top run 36. It will be readily apparent that the runs 32 and 36 are in opposed spaced relation. Although the spacing of the runs 32 and 36 is adjustable, it is to be understood that the spacing between the runs 32 and 36 remains constant, after being preset, during the operation of the machine.

The top unit 28 is provided with a motor 38 which is suitably connected to drive sprockets for the conveyor belts 30 and 34 so as to drive the runs 32 and 36 in the same direction and at the same rate.

In order to assure the introduction of the filled casing 22 between the runs 32, 36, there is provided a funnel-shaped guide 40 into which the newly filled casing is directed. The guide 40 is carried by a suitable support 42 which may be mounted on a cabinet 44, which cabinet 44 may also support the filling horn turret unit 18 and the apparatus 24.

After the casing 22 is filled in accordance with this invention, then the product is sausage links, it passes into and through a conventional linking apparatus 46 which at regularly spaced intervals squeezes together intermediate portions of the casing 22 and applies a twist thereto to separate the filled casing 22 into a plurality of identical links 48.

It is to be understood that the motor 38 is provided with a suitable control unit 50 wherein the motor 38 may be suitably controlled by an operator as is deemed necessary. It is also to be understood that the unit 50 may include control means for effecting the indexing of the filling head turret 18.

Reference is now made to FIG. 3 wherein there is illustrated a typical nominal circular cross section of the casing 22. It is to be understood that prior to this invention the casing 22 was paid out manually at a rate wherein, while it maintained generally the circular cross section, the casing was wrinkled and only partially filled.

Referring now to FIG. 4, it will be seen that there is shown a typical cross section of the casing 22 as it passes through the apparatus 24. The casing 22 is flattened slightly at the top and bottom so as to have a controlled oval cross section it is understood that the oval cross section will vary in accordance with the spacing between the conveyor belt runs 32, 36. With respect thereto, the run 32 is illustrated with a suitable back-up 52, while the run 36 will be provided with a suitable back-up 54. The spacing between the back-ups 52 and 54 is fixed or adjusted but is not varied in accordance with the variation in size of the casing 22 during the filling operation.

It will be seen that due to the flattening of the top and bottom of the casing 22, the casing 22 assumes an oval cross section. It is known that with respect to a tube, the maximum cross-sectional area is obtained when the tube is of a circular cross section, and that when the cross-sectional configuration of the tube is modified in any manner, the cross-sectional area is reduced. By a controlled flattening of the casing 22, the cross-sectional area thereof may be varied so as to be on the order of 85-95% of the cross-sectional area of the same casing when it is circular. It is upon this principle that this invention is based.

When the percentage of desired product fill is determined, the spacing of the top part 28 relative to the bottom part 26 is varied, thus to vary the spacing of the runs 32, 36. In FIG. 5, the top part 28 is schematically illustrated as being spaced above the bottom part 26 by means of suitable spacer blocks 56 of which only one has been illustrated. Fine adjustment of the spacing may further be provided by way of shims 58 which may vary in thickness or number.

Having predetermined the desired amount of underfill, the cross-sectional area of the modified casing cross section is then determined and the spacing of the runs 32 and 36 preset. The machine is now ready for operation, and all that remains to be controlled is the speed of driving the conveyor belts. In order partially to check whether the resultant links 48 are of the desired size (weight), the apparatus 24 may include a suitable scale 60 for which there is provided a tray 62 designed to receive a preselected number of links 48. With this weight check and by a time-to-time slight modification of the speed of driving the belts 30, 34, the proper weight of product in the proper length casing may be adjusted and controlled.

Referring now to FIG. 6, it will be seen that the sub-volume filled casing 22 in another form of product is mounted on a reel 64 in the form of strands which extend between remote bars 66 of the reel. The reel 64 is mounted in any type of suitable support frame 68 and may include a support shaft 70 which is driven by a motor 72 so that the reel 64 accepts the sub-volume filled casing 22 at a preselected line wherein preferably the filled casing 22 is placed under a slight degree of tension.

After the product, which may be a beef stick, is mounted on the reel 64, the reel 64 is directed into a suitable cooking device wherein the product within the casing 22 is cooked and wherein there will be controlled shrinkage in cross section only of both the product and the casing while the length of each resultant stick which extends between the support bars 66 will remain constant.

Where the casing 22 is filled with a product which may expand while being processed, the filled casing may be handled in any desired manner, and no effort has been made here to illustrate the manner of handling such casings.

Although only a preferred embodiment of the invention has been specifically illustrated and described, it is to be understood that minor variations may be made in the apparatus without departing from the spirit and scope of the invention as defined by the appended claims.

I claim:

1. An apparatus for the automatic controlled sub-volume filling of a casing, said apparatus comprising in combination a filling machine including filling tube means for supplying a product under pressure into a tubular casing, and a combined casing feed device and cross section shaping device, said combined casing feed and cross section shaping device including conveyor means having opposed spaced runs for receiving therebetween a casing having a filling therein, said conveyor runs defining an elongated casing receiving space having an entrance adjacent said filling tube, said apparatus being particularly adapted to receive a casing normally generally circular in cross section when filled, and said conveyor runs spacing being less than the nominal diameter of the intended casing as to effect a temporary change in casing cross section with the cross-sectional area of said modified cross section is on the order of 85 to 95 percent of the area of said circular cross section.

2. An apparatus according to claim 1 together with means for varying said spacing between said conveyor runs to vary the area of the cross section of the temporarily deformed casing.

3. An apparatus according to claim 1 together with means for varying the speed of advance of said conveyor runs to control the time the filled product is disposed tightly against the interior of the casing in its modified cross section.

4. An apparatus according to claim 1 together with a twistlinker for receiving the filled modified cross section casing and closing and twisting the casing at intervals and forming filled circular cross-sectional links.

5. An apparatus according to claim 4 together with means for varying the speed of advance of said conveyor runs to control the time the filled product is disposed within the casing prior to linking of the filled casing.

6. An apparatus according to claim 1 wherein said casing is a food product casing and said product is a food product.

7. A process of forming on a continuous basis product packages, said process comprising providing a cylindrical casing, passing the casing between two opposed spaced apart conveyor runs while supplying a flowable product under pressure into the casing, controlling the spacing of the conveyor runs to be less than the nominal diameter of the casing and thereby temporarily modifying the cross section of the filled casing to be of a less area than the area of the normal circular cross section to provide for a controlled sub-volume filling of the casing, and after the partially filled casing passes from said conveyor runs performing a further operation on the casing.

8. The process of claim 7 wherein said modified cross-sectional area is on the order of 85 to 95 percent of the circular cross sectional area.

9. The process of claim 7 wherein the flowable product is an edible product.

10. The process of claim 7 wherein the further operation is a linking step to divide the casing into separate links.

11. The process of claim 7 wherein the further operation is a cooking step.

12. The process of claim 7 wherein the further operation includes reeling the casing on a reel to form sticks.

* * * * *